No 848,616. PATENTED MAR. 26, 1907.
E. BROWN & J. W. T. DUVEL.
APPARATUS FOR THE RAPID DETERMINATION OF THE MOISTURE CONTENT OF GRAIN.
APPLICATION FILED MAR. 2, 1907.

3 SHEETS—SHEET 1.

UNITED STATES PATENT OFFICE.

EDGAR BROWN, OF NEW YORK, AND JOSEPH W. T. DUVEL, OF OHIO.

APPARATUS FOR THE RAPID DETERMINATION OF THE MOISTURE CONTENT OF GRAIN.

No. 848,616.  Specification of Letters Patent.  Patented March 26, 1907.

Application filed March 2, 1907. Serial No. 360,248.

*To all whom it may concern:*

Be it known that we, EDGAR BROWN, a citizen of the United States and an officer of the Department of Agriculture, and a legal resident of the State of New York, whose post-office address is Department of Agriculture, Washington, District of Columbia, and JOSEPH W. T. DUVEL, a citizen of the United States, and a legal resident of the State of Ohio, whose post-office address is Department of Agriculture, Washington, District of Columbia, have invented certain new and useful Improvements in Apparatus for the Rapid Determination of the Moisture Content of Grain and other Similar Substances, of which the following is a specification.

This application is made under the act of March 3, 1883, Chapter 143, (22 Stat., 625,) and the invention herein described and claimed may be used by the Government of the United States or any of its officers or employees in the prosecution of work for the United States or by any person in the United States without the payment of any royalty thereon.

This invention has relation to the simplification of apparatus for determining the moisture content of grain by means of the distillation process in oil and the subsequent condensing and measuring of the water distilled, making it convenient and practical for commercial use. The oil used is necessarily one having a higher boiling-point than water and may be a heavy petroleum distillate.

The principal object of this invention is to provide an apparatus for the determination of moisture in grain and other substances by means of which these determinations can be made rapidly and with but little previous technical training on the part of the operator, making it practicable for general use.

The object sought in the apparatus is to furnish in convenient form the necessary evaporating-chamber in which to heat the flasks containing the mixture of oil and substance being tested, the condenser, and the graduated cylinders for collecting the distillate.

Figure 1:
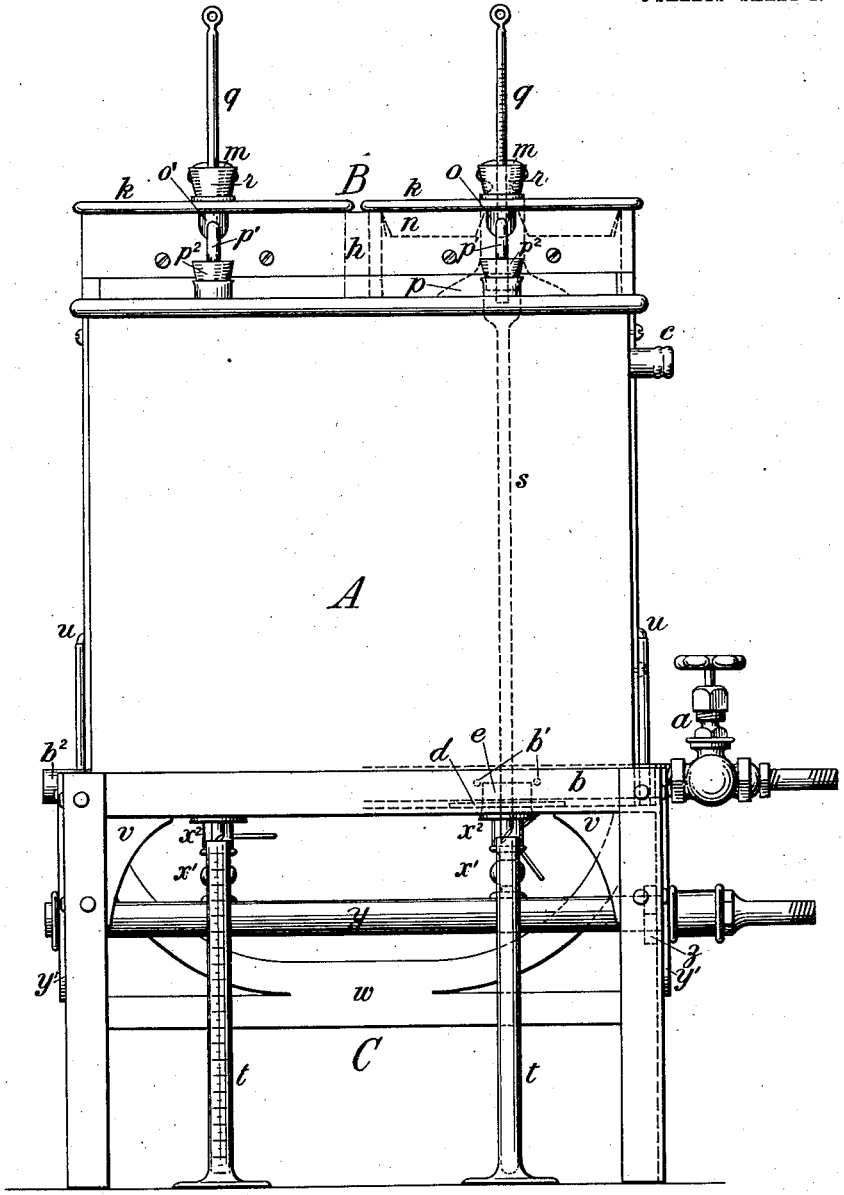
Figure 2:
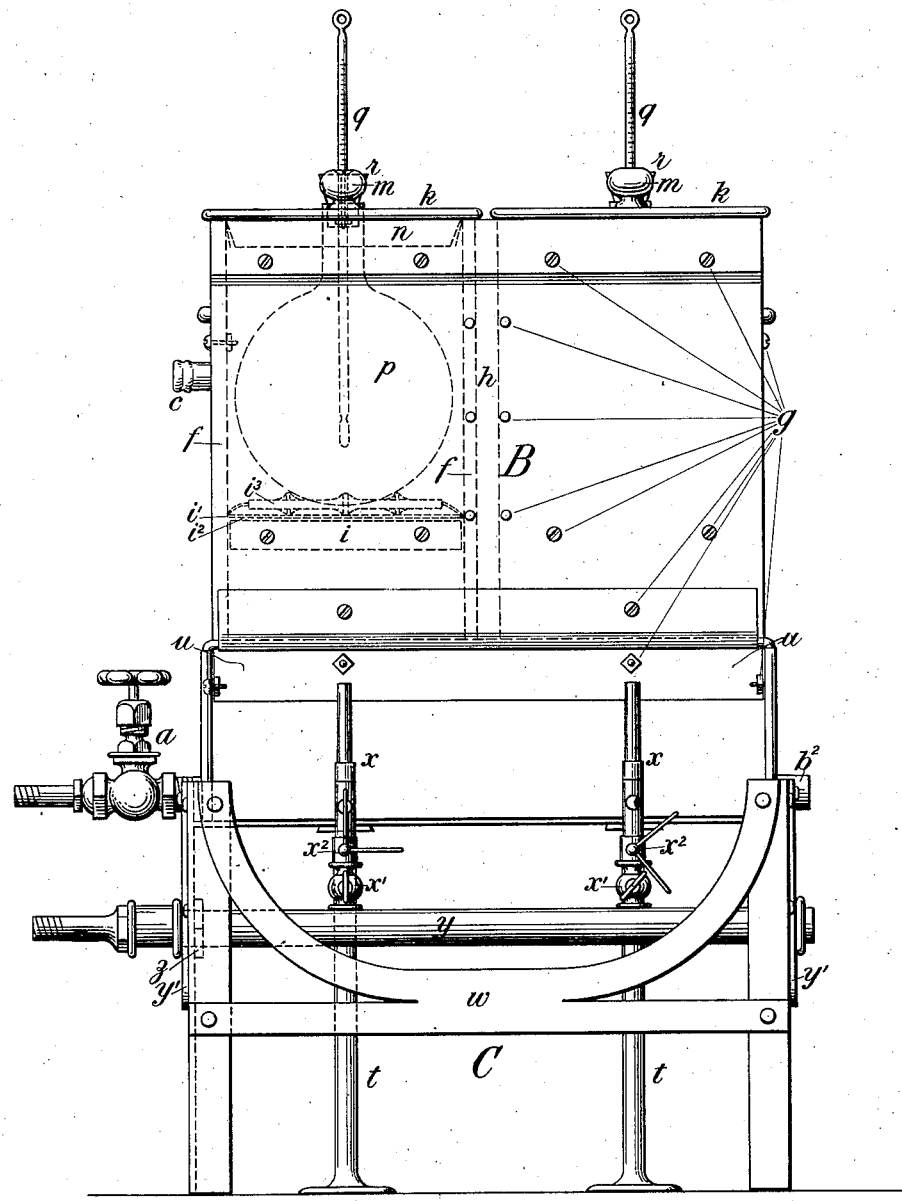
Figure 3:
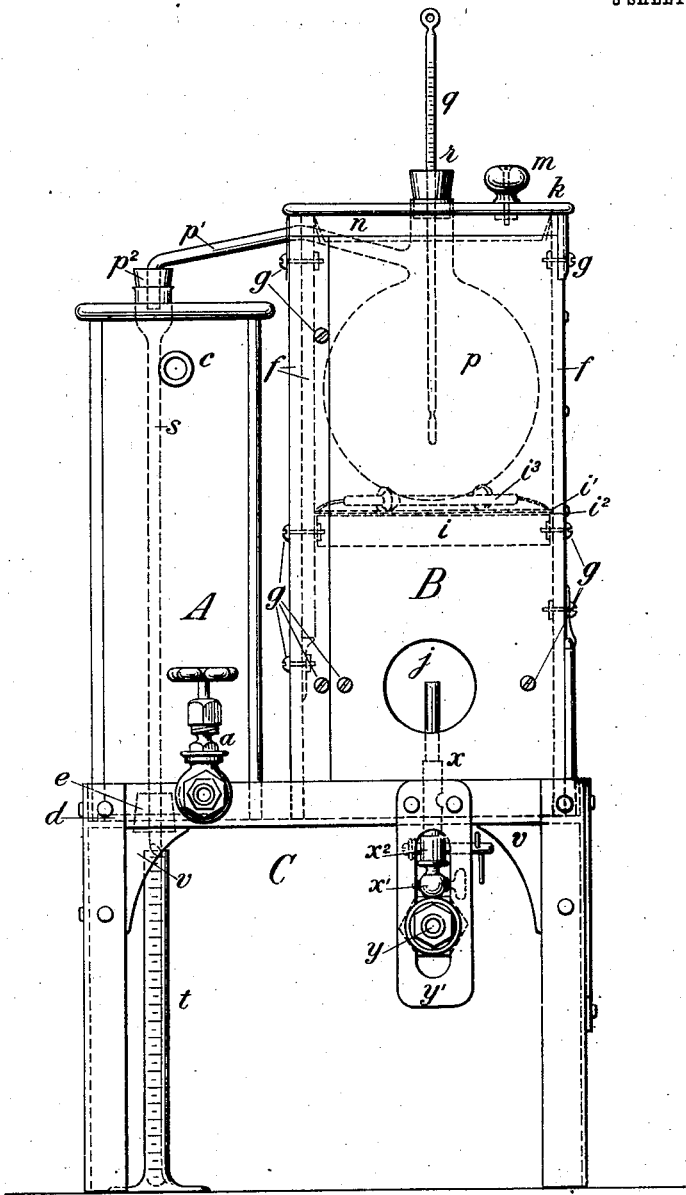

In the accompanying drawings, Figure 1 is a front view of the apparatus. Fig. 2 is a back view of the apparatus. Fig. 3 is an end view of the apparatus.

Similar characters of reference designate corresponding parts in all the figures of the drawings.

A represents the cold-water tank, through which the condenser-tube passes.

B represents the evaporating-chamber, which is divided into compartments in which the flasks containing the substance of which the moisture determination is to be made are heated.

C represents a stand supporting the cold-water tank and the evaporating-chamber.

$a$ is the valve for regulating the flow of cold water into the tank.

$b$ is a pipe connected with the valve $a$, running the full length of the tank and having two small openings $b'$ near each of the condenser-tubes, said openings being drilled at such an angle that the two streams of water will fall directly at the base of the condenser-tube $s$. The pipe $b$, which projects through both ends of the tank, is closed at one end with a screw-cap $b^2$, which is interchangeable with the valve $a$ should it be desired to make the water connection at the opposite end of the tank. At one end of the water-tank near the tube is the overflow-pipe $c$. Around the holes in the bottom and a little to the front of the tank are soldered heavy washers $d$, so that the rubber stopper $e$, supporting the condenser-tube $s$, can be pressed in firmly in order to prevent any leaking.

The evaporating-chamber B is divided into compartments, which are best shown in Fig. 2. The compartments are lined with heavy asbestos $f$, and likewise the side of the compartment nearest the water-tank is covered on the outside with asbestos $f$, as shown in Fig. 3, the asbestos being fastened to the walls of the evaporating-chamber by means of screw-bolts $g$. The compartments of the evaporating-chamber are separated from each other by a small air-space $h$ in order better to protect one compartment from the heat in an adjoining compartment.

$i$, Figs. 2 and 3, represents a flange on the inside of the compartments for supporting the flask $p$. Immediately above the flange $i$ is a wire-gauze $i^2$, which is held in place by means of a plate, by preference of galvanized iron, said plate having a central opening of approximately the same size as the diameter of the flask $p$. The flask $p$ is slightly raised from the wire-gauze by means of the flanged pipe-stem triangle $i^3$ in order to prevent the substance in the bottom of the flask directly over the flame from becoming too highly heated.

$j$, Fig. 3, represents holes cut in the ends of the evaporating-chamber for the purpose of giving ample supply of air to the burners in the end compartments. Each compartment is provided with a separate asbestos-lined cover $k$, having an opening in the center, through which the neck of the flask projects. The covers are provided with a wooden handle $m$ and are made with a flange $n$ projecting down into the compartment, said flange having a notch $o$ directly opposite the notch $o'$ in the front of each compartment, through which the side tube $p'$ of the flask $p$ leads to the condenser-tube, to which it is connected by means of a rubber stopper $p^2$. The neck of the flask $p$ is closed with a perforated rubber stopper $r$, carrying the thermometer $q$, the lower end of which projects into the mixture of oil and the substance for moisture determination. As the water is driven off, it passes out through the side tube $p'$, is condensed in the tube $s$, which passes through the cold-water tank A. The condensed water is then collected and measured in the graduated cylinder $t$ beneath the condenser, said cylinder being graduated from the base upward by preference, the graduations being such that the percentage of water can be read direct.

The back of the evaporating-chamber is left partially open, as shown at $u$ in Fig. 2, in order to facilitate the manipulation of the burners and to provide a sufficient supply of air. The stand C is made, preferably, of angle-iron and is reinforced by means of the braces $v$. The cross-piece $w$ at the back of the stand, Figs. 1 and 2, is dropped slightly from the top in order that the burners may be better operated.

$x$ represents the burners, which are provided with an extra valve $x'$ in order that the flow of gas may be regulated either by the extra valve $x'$ or by the valve $x^2$, which is a part of the burner, the remaining valve being then used for turning on and off the gas.

$y$, Fig. 3, represents the gas-pipe, which is suspended in the slot $y'$ in order that the height of the burner can be readily adjusted, the pipe $y$ being ultimately fixed by means of the nut $z$. (Shown in Figs. 1 and 2.)

From the foregoing it is thought that the construction, operation, and many advantages of the herein-described invention will be apparent without further description, and it will be understood that various changes in the size, shape, proportion, and minor details of construction may be resorted to without departing from the spirit or sacrificing any of the advantages of the invention.

Having thus described the invention, what is claimed as new, and desired to be secured by Letters Patent, is—

An apparatus for determining the percentage of moisture in grain or other similar material, consisting of (a) an evaporating-chamber which is divided into compartments, said compartments being lined with asbestos and being separated from each other by double walls with a convenient air-space in order to prevent any one compartment from being affected by the heat from the adjoining compartment, said compartments being further provided with a flange near the base, projecting into the interior, for supporting the wire-gauze and triangle on which the flask containing the mixture of oil and the substance of which the moisture determination is to be made, rests, the compartments of the evaporating-chamber being further provided with asbestos-lined covers, each having an opening in the center through which the neck of the flask projects, said covers being also provided with a flange fitting down into the compartments; (b) spherical distillation-flasks having an opening at the top through which the oil and substance of which the moisture determination is to be made, is introduced, closed by a rubber stopper carrying a thermometer, said flasks also having a side tube leading off from the neck through which the distillate passes into condenser-tubes; (c) a condensing-tank and condenser-tubes; (d) graduated cylinders for receiving the distillate; all in combination forming the apparatus, substantially as described.

In testimony whereof we affix our signatures in the presence of two subscribed witnesses.

EDGAR BROWN.
JOSEPH W. T. DUVEL.

Witnesses:
 HARRY GODING,
 H. J. FEGAN.